United States Patent [19]

Guan

[11] Patent Number: 5,099,519
[45] Date of Patent: Mar. 24, 1992

[54] HEADPHONES

[76] Inventor: Yu Guan, 120 Larsen Hall, Dept. of Electrical Engineering, University of Florida, Gainesville, Fla. 32611

[21] Appl. No.: 529,586
[22] Filed: May 29, 1990
[51] Int. Cl.⁵ .................. H04R 25/00; H04M 1/00
[52] U.S. Cl. .................... 381/183; 381/187; 379/430
[58] Field of Search ............ 381/183, 187, 169, 74, 381/72, 25, 151; 379/430, 433

[56] References Cited

U.S. PATENT DOCUMENTS

| | | | |
|---|---|---|---|
| 3,306,991 | 2/1967 | Wood | 381/72 |
| 3,551,607 | 12/1970 | Tommasi | 379/433 |
| 3,971,900 | 7/1976 | Foley . | |
| 4,087,653 | 5/1978 | Frieder, Jr. et al. | 379/430 |
| 4,088,849 | 5/1978 | Usami et al. | 379/430 |
| 4,138,598 | 2/1979 | Cech . | |
| 4,420,657 | 12/1983 | Larkin . | |
| 4,484,029 | 11/1984 | Kenney . | |
| 4,821,318 | 4/1989 | Wu | 379/430 |
| 4,882,745 | 11/1989 | Silver | 381/183 |
| 4,907,266 | 3/1990 | Chen | 381/183 |

FOREIGN PATENT DOCUMENTS 1218086  1/1971  United Kingdom ........... 381/183

Primary Examiner—Forester W. Isen
Assistant Examiner—Jason Chan

[57] ABSTRACT

A headphone having two earpieces, one of which contains a speaker, and the other of which contains a microphone. The person wearing the headphone can speak in a normal manner and have the microphone pick up his words. Sound waves are transmitted from the person's vocal cords through his throat and eustachian tube into his eardrum. The sound waves are passed along the ear canal into the microphone. A person wearing the headphone can both listen and speak, while having his hands completely free to perform associated tasks, e.g. taking notes, operating a typewriter, etc. A fold-up version can be converted to a regular telephone handset instantly.

2 Claims, 2 Drawing Sheets

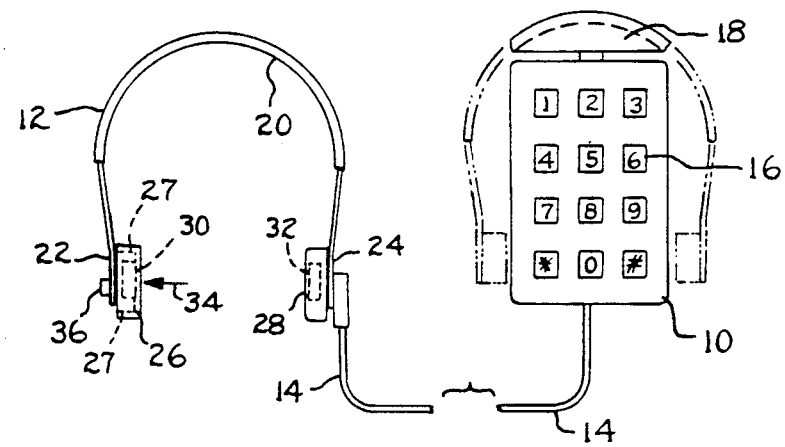
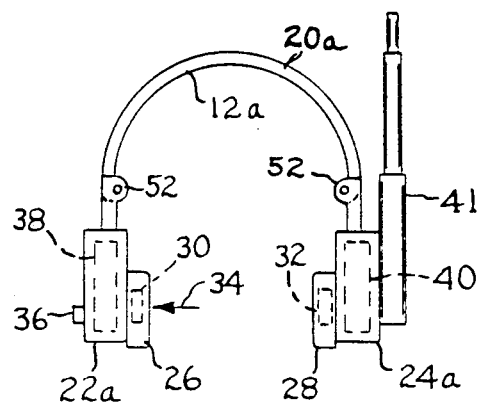
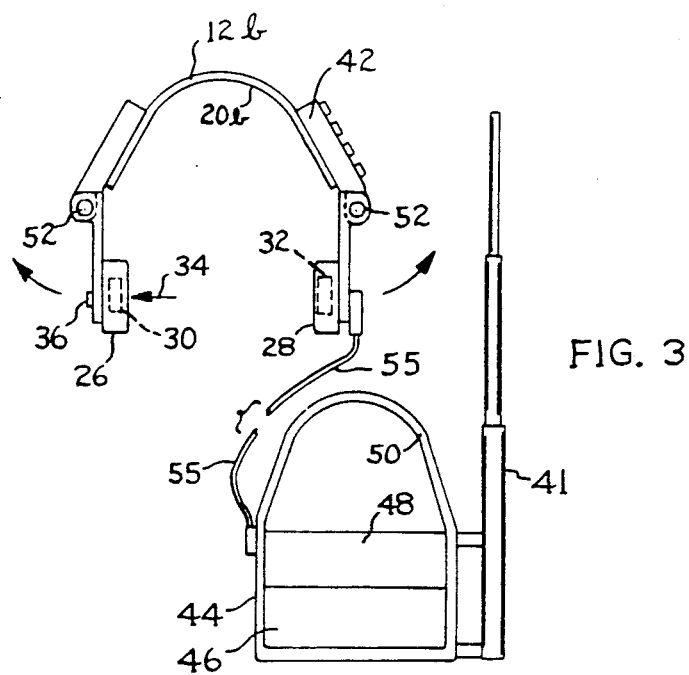
FIG. 1
FIG. 2
FIG. 3

HEADPHONES

BACKGROUND AND SUMMARY OF THE INVENTION

The invention relates to headphones such as are used with telephones or radios, e.g. walkie talkies or cellular phones. The invention is particularly directed to a headphone that can be used to both send and receive audio information. In its preferred form the headphone comprises two ear pieces; a speaker (receiver) is mounted within one of the ear pieces, and a microphone is mounted within the other ear piece, such that the person wearing the headphone can both send and receive audio information without using his hands. The person's hands are free to do other things, e.g. drive a vehicle, or take down information on a pad of paper, or operate a typewriter.

Under this invention the microphone is built into one of the earpieces; it is not located in front of the person's face on the end of a cantilever arm (boom) where it might prevent the user from performing certain tasks, and where it might be subject to interference from surrounding noise.

The invention takes advantage of the fact that in human beings the vocal chords are in communication with the hearing organs, such that when a person speaks the vocal information (sound waves) travel not only out of the person's mouth but also internally against the person's eardrums. A microphone placed in close adjacency to a person's outer ear will readily pick up words being spoken by the person A person's vocal chords are located near the top of his larynx (voice box) which connects with the person's throat. Thus, the vocal chords and ear drum are in communication with each other, such that air vibrations generated by the voice box are transmitted to the ear drum(s). When a person speaks sound waves pass through the eardrums. If a microphone is placed against the surface of a person's outer ear, i.e. against an ear lobe, it will pick up the voice-generated sounds. The present invention utilizes this phenomena.

The invention is believed useful in several situations where it is desirable for a person to both hear and speak without having to use his hands to hold a handset up to his face; e.g. telephone operators, two-way radio operators, persons operating vehicles (automobiles, airplanes, etc.), news reporters taking notes or speaking into television cameras, medical or chemical workers wearing mouth covers or respirators, or military personnel while operating guns or looking through telescopic sights. In any of these situations it is desirable that the person have his hands free, and also that the area in front of the person's face be unobstructed. The present invention achieves these objectives. The invention also is advantageous where the user is in a high noise area, or where the person desires to mask the fact that he has a microphone on his person.

There are already in existence headphones having boom-attached microphones, e.g. U.S. Pat. No. 4,420,657 to W. Larkin, U.S. Pat. No. 4,138,598 to K. Cech, U.S. Pat. No. 3,971,900 to J. Foley, and U.S. Pat. No. 4,484,029 to D. Kenney. My invention is believed to be a departure from the headphone constructions shown in these patents. I understand that there are in existence communication devices employing in-ear type microphones. However, such devices are thought to be unsuited for sending and receiving signals simultaneously; also, such devices use open type speakers which disturb other people in the immediate vicinity and/or interfere with communication privacy. The systems that I am proposing overcome the shortcomings of the prior art devices.

In a preferred form of the invention the headphone is incorporated into a fold-up telephone. This telephone includes two ear pieces hingedly attached to cushion structures that are adapted to extend along side areas of the person's head. A retractable flexible strip member interconnects the two cushion structures. This telephone unit is adapted for fold-up to a miniaturized compact mode; in the compact mode the telephone can be used as a regular handset or be carried in the person's pocket.

THE DRAWINGS

FIG. 1 is a front elevational view of an apparatus embodying the invention.

FIG. 2 is a front elevational view of another apparatus constructed according to the invention.

FIG. 3 is a front elevational view of another apparatus utilizing the invention.

Figure 4:
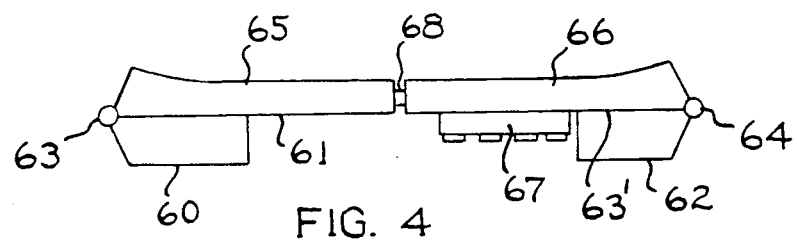
Figure 5:
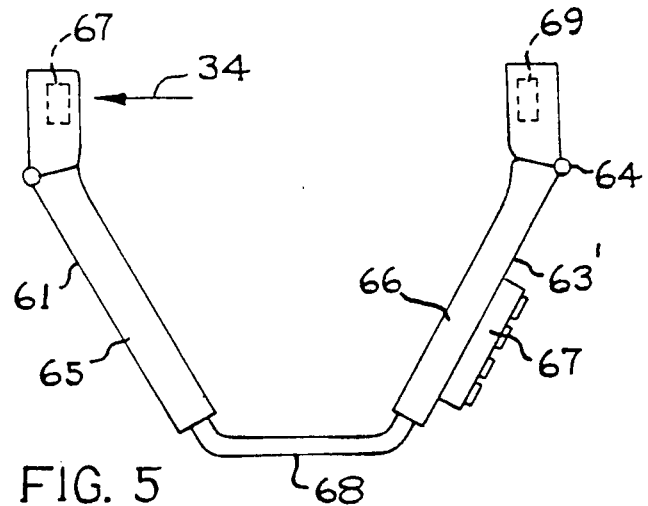

FIGS. 4 and 5 are external views of a cordless telephone embodying the invention. FIG. 4 shows the telephone in a folded (storage) mode. FIG. 5 shows the phone in a use condition.

DESCRIPTION OF A PREFERRED EMBODIMENT OF THE INVENTION

FIG. 1 illustrates a telephone receiving-sending apparatus that includes a wall-mounted base 10 connected to a headphone 12 via an electrical cord 14. The base has a number of pushbuttons 16 thereon for dialing outgoing calls. Also, the base has a cradle 18 thereon adapted to support the headphone in hanging, standby position. When the headphone is removed from the cradle the telephone is activated to receive and send calls.

Headphone 12 is of generally conventional construction. It comprises a concave support structure (headband) 20 adapted to partially encircle a person's head. End portions 22 and 24 of the concave support structure are locatable outside the person's ears. Ear pieces 26 and 28 are mounted on end portions 22 and 24 to engage the wearer's ear lobes. Support structure 20 may be a telescopic structure constructed partly of a spring-like plastic or metal material to ensure a relatively secure pressure fit of ear pieces 26 and 28 against the person's ears.

A microphone 30 is located within ear piece 26 in facing relation to the person's ear. The microphone is a directional microphone oriented to receive sound waves primarily in the arrow 34 direction, i.e. sound waves coming outwardly through the person's ear canal. The microphone may have a smaller diameter than earpiece 26, with sound-absorbing material 27 surrounding the peripheral edge surface of the microphone to minimize transmission of external noise into the microphone. External noise has minimal effect on microphone performance. The microphone can pick up sounds coming out through the person's ear canal without picking up extraneous sounds to any significant degree.

A speaker (receiver) 32 is located within earpiece 28 to translate electrical signals received along cord (conductor 14) into audible information in the person's ear.

With the illustrated arrangement the person wearing the headphone can receive incoming calls through earpiece 28 and deliver (speak) outgoing calls through ear piece 26. This is possible even though the person's mouth is not oriented to speak into microphone 30; the person's ear acts to deliver the audio information to microphone 30 while the person speaks with normal volume (intensity). The person can speak or listen without adjusting any switches or controls on the headphone or on base 10.

At times the person wearing the headphone may wish to speak to some other person in the room without having the person on the other end of the phone line hear what he has to say. Therefore, a mute switch 36 may be provided on ear piece 26. Depression of the pushbutton switch 36 momentarily turns off microphone 30, such that the person's words are not transmitted through the telephone line. Releasing the switch button reconnects the microphone to the line.

Headphone 12 is shown as a U-shaped structure adapted to extend over and around the top of a person's head. The headphone could have other configurations, e.g. as a device built into a helmet. The earpieces or end portions of the headphone can have devices thereon to facilitate attachment of the headphone to the person's head without necessarily requiring that the headphone extend over the top of the person's head.

FIG. 1 illustrates the invention applied to a telephone environment. FIG. 2 shows the invention applied to a walkie-talkie radio apparatus. In FIG. 2, the enlarged end portions 22a and 24a of headphone 12a form housings for a radio transmitter (or transceiver) 38 and a radio receiver (or transceiver) 40. The headphone unit may have an antenna 41 associated therewith. Alternately, an antenna may be built into headband 20a.

A directional microphone 30 located within earpiece 26 delivers electrical signals to radio transmitter 38. A speaker 32 within earpiece 28 receives electrical signals from radio receiver 40. Batteries within the receiver 40 housing and/or transmitter 38 housing provide operating power for the portable radio apparatus. The operation of the microphone in the FIG. 2 apparatus is the same as the operation of the FIG. 1 microphone. Hinges 52 may be incorporated into the apparatus for fold-up of housings 38 and 40 into the concavity defined by headband 20a (storage mode).

FIG. 3 illustrates the invention applied to a cellular phone, as used e.g. in automobiles and/or away from a conventional telephone line. In this case the telephone has a pushbutton dialing pad 42 thereon for dialing outgoing calls. Also, there is included a separate suitcase unit 44 for supporting batteries 46 and transceiver/logic module 48. The suitcase unit includes a handle 50 that can serve as a cradle for the headphone when the headphone is in its non-use storage mode. The headphone can have hinge connections 52 and/or a retractible headband 20b to facilitate fold-up of the headphone, as may be necessary for disposition of the headphone atop handle 50.

The FIG. 3 apparatus includes a directional microphone 30 located within earpiece 26, and a speaker 32 located within earpiece 28. The output of microphone 30 is delivered through flexible cable (line) 55 to the transceiver 48, which broadcasts a radio signal to a central telephone switching facility. Incoming calls are received by transceiver 48 and directed through cable 55 to speaker 32.

The invention is concerned especially with the disposition of microphone 30 in one of the headphone earpieces and speaker 32 in the other earpiece, such that the person wearing the headphone can send and receive calls via a telephone or a radio simultaneously, without requiring him to use his hands to hold a handset or to manipulate the microphone. The area in front of the person's face is unobstructed so that he can have a complete view of the forward terrain, e.g. to drive a vehicle or to look through a rifle sight, etc. A cordless telephone designed on the basis of this invention can be completely free of wires, thereby giving the user complete use of his hands and a clear view of the forward scene.

FIGS. 4 and 5 illustrate the invention applied to a telephone of the fold-up type. The illustrated telephone comprises earpieces 60 and 62 having hinge connections 63 and 64 with padded cushion structures 65 and 66. A dialing panel 67 is carried on the outer side face of cushion structure 66. The two cushion structures are interconnected by a flexible strip means 68 that extends from cushion structure 65 into a longitudinal slot in cushion structure 66, such that the telephone can be expanded or contracted as desired; strip means 68 can function as an antenna. A microphone 67 is located within earpiece 60; an earphone (receiver) 69 is located within earpiece 62. The microphone is oriented to receive sound waves propagated along directional line 34.

FIG. 4 shows the telephone in a folded condition wherein earpieces 60 and 62 are folded onto the outer faces 61 and 63' of the respective cushions 65 and 66. Connector strip 68 is retracted into cushion 66. In this mode, the telephone can be used as a regular handset or be put in storage. FIG. 5 shows the telephone in condition for placement on the user's head. Dialing pad 67 has its pushbuttons facing away from the cushion structure inner surfaces, such that dialing pad 67 can be used in either condition of the telephone (FIG. 4 or 5).

It is my understanding that previously it has been proposed to use a single electric-audio transducer both as a microphone and as a receiver. My proposed system contemplates separate transducers for the sending and receiving functions. This is advantageous in that the circuitry is simplified. Also, the separate transducers are preferably located within sound-absorbent ring structures within the respective earpieces, such that microphone/receiver operations are largely uninfluenced by extraneous noise.

The microphone can be battery-powered if so desired. It is also possible to use a high impedence dynamic microphone having no battery power. Various controls can be associated with the microphone, e.g. for adjusting the sound pick-up characteristics or turning the microphone on and off.

What is claimed is:

1. A headphone for receiving and sending electrical signals, comprising two earpieces adapted for positioning over the wearer's ears, and a headband structure interconnecting said earpieces; a directional microphone located within one of the earpieces for translating vocal sounds generated by the wearer's voice box into electrical signals, said microphone being oriented to receive vocal information primarily only through a surface thereof oriented to face the wearer's ear; a speaker located within the other earpiece for delivering audio signals into the wearer's adjacent ear; said headband structure comprising two padded cushion structures (65 and 66), and a flexible strip means (68) extending from one cushion structure into the other cushion structure as a telescopic fit therein; and a dialing panel (67) carried on an external surface of said other cushion structure facing away from the head area of the person wearing the headphone; each earpiece being hingedly connected to an end of an associated cushion structure so that each earpiece can be folded onto an external surface of the associated cushion structure; said other cushion structure having sufficient length that the pushbuttons on the dialing panel are freely accessible when the respective earpiece is folded onto the external surface of the cushion structure.

2. The headphone of claim 1, wherein said microphone is the only electric signal device in said one earpiece, and said speaker is the only electric signal device in said other earpiece.

* * * * *